United States Patent
Bennington et al.

(10) Patent No.: US 9,512,002 B2
(45) Date of Patent: Dec. 6, 2016

(54) HYDROGEN STORAGE PELLET

(71) Applicant: CELLA ACQUISITION LIMITED, Didcot (GB)

(72) Inventors: Stephen Bennington, Didcot (GB); Sean McGrady, Didcot (GB); David Royse, Didcot (GB); Arthur Lovell, Didcot (GB); Lyndsey Mooring, Didcot (GB); Tom Headen, Didcot (GB)

(73) Assignee: CELLA ACQUISITION LIMITED, Didcot (GB)

( * ) Notice: Subject to any disclaimer, the term of this patent is extended or adjusted under 35 U.S.C. 154(b) by 0 days.

(21) Appl. No.: 14/136,966

(22) Filed: Dec. 20, 2013

(65) Prior Publication Data

US 2014/0178291 A1  Jun. 26, 2014

(30) Foreign Application Priority Data

Dec. 21, 2012  (GB) .................................. 1223259.1

(51) Int. Cl.
*C01B 3/00* (2006.01)

(52) U.S. Cl.
CPC ............. *C01B 3/0078* (2013.01); *C01B 3/001* (2013.01); *C01B 3/0084* (2013.01); *Y02E 60/327* (2013.01); *Y02E 60/364* (2013.01)

(58) Field of Classification Search
CPC ....... C08L 9/00; B01J 13/02; B01J 23/3242; B01J 23/3244; B01D 67/0009; B01D 67/0039; C01B 2202/28; C01B 31/0273; C01B 31/04; C01B 3/0078; C01B 3/0084; H01M 10/0525; H01M 2004/027; H01M 4/0404; H01M 4/137; H01M 4/1399; H01M 4/366; H01M 4/602; H01M 4/62; H01M 4/625

USPC ....................... 502/401; 423/644, 648.1, 652
See application file for complete search history.

(56) References Cited

U.S. PATENT DOCUMENTS

| | | | |
|---|---|---|---|
| 7,118,611 B2 | 10/2006 | Snow et al. | |
| 7,771,887 B2 | 8/2010 | Morse et al. | |
| 7,807,131 B2 | 10/2010 | Eickhoff | |
| 7,963,116 B2 | 6/2011 | Autrey et al. | |
| 8,097,234 B1 | 1/2012 | Vajo et al. | |
| 8,377,416 B2 * | 2/2013 | Varma et al. | 423/648.1 |
| 2006/0060820 A1 | 3/2006 | Schumacher et al. | |
| 2007/0068071 A1 | 3/2007 | Kelly et al. | |

(Continued)

FOREIGN PATENT DOCUMENTS

| | | |
|---|---|---|
| CN | 102030313 B * | 7/2012 |
| EP | 2055669 A2 | 5/2009 |

(Continued)

OTHER PUBLICATIONS

Uemura et al. "Encapsulation of Hydrogen Storage Alloy by Polymer", 1991, Journal of Chemical Engineering of Japan, No. 3, Tokyo, JP, p. 377-381.*

Borodina et al., Polyelectrolyte Multilayered Nanofilms as a Novel Approach for the Protection of Hydrogen Storage Materials, Applied Materials and Interfaces, Published on Web Apr. 21, 2009, pp. 996-1001.

(Continued)

*Primary Examiner* — Stanley Silverman
*Assistant Examiner* — Syed Iqbal
(74) *Attorney, Agent, or Firm* — Birch, Stewart, Kolasch & Birch, LLP

(57) ABSTRACT

A coated hydrogen storage pellet; wherein the pellet comprises a hydrogen-storage material; the coating comprises a hydrogen-permeable polymer and the coating has a mean thickness of less than 50 μm.

19 Claims, 1 Drawing Sheet

(56) References Cited

U.S. PATENT DOCUMENTS

Figure 1:
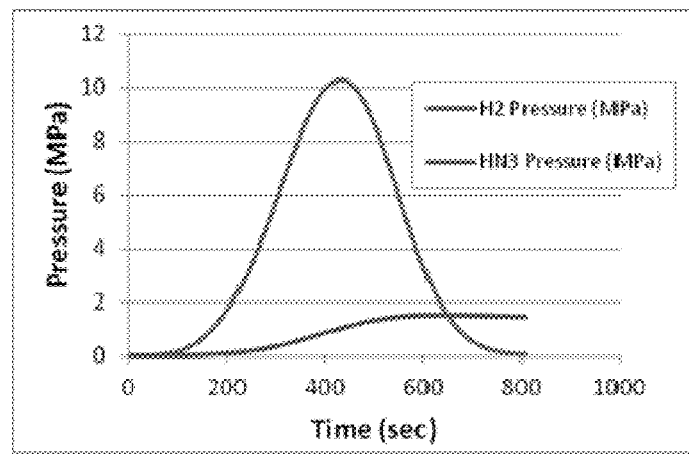

| | | |
|---|---|---|
| 2007/0124989 A1 | 6/2007 | Eickhoff et al. |
| 2009/0211399 A1 | 8/2009 | Mohtadi et al. |
| 2010/0064584 A1* | 3/2010 | Bae et al. ................ 48/61 |
| 2011/0297879 A1* | 12/2011 | Jorgensen et al. ....... 252/188.25 |
| 2013/0095307 A1 | 4/2013 | Bennington et al. |

FOREIGN PATENT DOCUMENTS

| | | |
|---|---|---|
| JP | 2004-027346 A | 1/2004 |
| WO | 2012/017218 A2 | 2/2012 |
| WO | WO 2013057588 A2 | 4/2013 |

OTHER PUBLICATIONS

Broderick et al., Covalent Layer-by-Layer Assembly of Water-Permeable and Water-Impermeable Polymer Multilayers on Highly Water-Soluble and Water-Sensitive Substrates, Dept. of Chemical and Biological Engineering, pp. 1786-1795.

Kamineni et al., Layer-by-Layer Nanoassembly of Polyelectrolytes Using Formamide as the Working Medium, Longmuir 2007, 23, pp. 7423-7427.

Sigma-Aldrich, Hydrogen Storage Materials, Material Matters, 2007, vol. 2, No. 2.

Uemura et al., Encapsulation of Hydrogen Storage Alloy by Polymer, 2344 Journal of Chemical Engineering of Japan, vol. 24 (1991) June, No. 3, Tokyo, JP, pp. 377-338.

* cited by examiner

HYDROGEN STORAGE PELLET

The present invention relates to a coated hydrogen storage pellet, a method of making the coated pellet, the use of the coated pellet to produce hydrogen and a method of producing hydrogen.

Hydrogen is an energy carrier that is carbon free at the point of use and offers the potential to decouple energy supply from the world's oil markets. Weight for weight it has nearly three times the energy of gasoline. However, there are challenges associated with its use, for example: finding a way to store what is normally a gas in a sufficiently dense form, and minimising the costs of the infrastructure needed to introduce such a new and disruptive technology.

Most of the large automotive manufacturers have stated that hydrogen is the ultimate replacement for gasoline and diesel. The specific energy of batteries is too low to provide a sufficient range for many commercial uses and it is likely that pure battery-electric vehicle will end up being used for commuter and other short range urban vehicles. Most manufacturers are planning to have 'affordable' hydrogen vehicles available by 2015.

The combination of a fuel cell plus hydrogen store can form a system that has two to three times the specific energy of a lithium-ion battery. Thus, there is the possibility of premium markets for the technology in aerospace, military, high-end consumer electronics and security applications that will pay a premium and act as early adopters to enable the technology to scale.

There are also potentially non-mobile uses for hydrogen, for example: to provide electricity for buildings or as emergency power supplies. These applications are less demanding in terms of the technology and are likely to be commercialised earlier.

Hydrogen can be used in internal combustion engines, a proven and inexpensive technology which may well provide the initial entry to the market. But to be truly competitive hydrogen needs to be used in a fuel cell, as these are two to three times more efficient than combustion engines. Fuel cells produce electricity and so hydrogen fuel-cell vehicles are electric, with similar control and power trains as battery-electric vehicles. In reality electric vehicles are likely to be hybrid, with batteries to provide demand levelling and the fuel cells to provide the range.

The current way of storing hydrogen for kilowatt-scale applications such as automotive, is to compress it to high densities using carbon-fibre composite tanks that are able to operate at pressures of up to 700 atmospheres. These tanks are expensive and a great deal of applied research is being focused on reducing the cost of their production. The technology is relatively mature and will almost certainly be used in the first generation of vehicles. However, the infrastructure needed is complex and very expensive. At the filling station the compressors that are used to rapidly compress the hydrogen to the 850 atmospheres needed to fill these tanks, cost in-excess of a million dollars each, and will require sophisticated safety systems if they are to be used by the general public.

Such high pressure tanks are not suitable for small scale applications, so other storage technologies are required. A great deal of research has been done into solid-state materials that can store the hydrogen in a compact and safe form. Two competing classes of materials are likely contenders for the ultimate solution. The first of these are ultra-porous materials called Metal Organic Frameworks (MOFs) that are able to store up to 7% hydrogen by weight at liquid nitrogen temperatures or at high pressures. Secondly, hydrides where the hydrogen is chemically bound to other atoms. After a long down-select process the US Department of Energy now only supports research into two classes of material: Boron hydrides, where the hydrogen is bonded to boron (with typically 10-12 wt % useable hydrogen), and alane where it is bonded to aluminium (with around 10 wt. % hydrogen).

For these hydrides there has been the recent realisation that regenerating the material within the vehicle is impractical for thermodynamic and engineering reasons. Most research in this area is now focused on moving powders or slurries so that the hydride can be pumped into and out of the vehicle and the regeneration done elsewhere, probably at large petrochemical plants where energy and hydrogen are readily available.

Although the hydrides are excellent in terms of the hydrogen specific density, they suffer from a number of technical issues:

1) The kinetics of the hydrogen release are often slow. For some of the borohydrides this release can take several hours.
2) The temperature of the hydrogen release can be very high, for example in excess of 300° C. for materials like lithium borohydride ($LiBH_4$).
3) The materials are usually air-sensitive, some to the point that they are pyrophoric.
4) The enthalpy and entropy associated with the dehydrogenation can be large making direct rehydrogenation impractical.
5) Some give off other impurities and volatiles that could damage a fuel cell.

Ultimately the choice of storage method or technology will depend on cost, safety and performance and is likely to be different for different applications.

Prior art hydrogen storage materials are known in the form of a capsule filled with a powdered hydrogen storage material, see for example, U.S. Pat. No. 8,097,234 B1. In this case, the majority, if not all, of the structural integrity of the material is provided by the capsule wall. In such cases, the capsule walls typically have a thickness of at least 0.2 mm. Because there is no solid core to which the capsule's plastic may bind to, the capsule itself needs to be sufficiently robust to be able to withstand the mechanical forces, including the internal pressure that it will experience. In one particular embodiment in U.S. Pat. No. 8,097,234 there is described a 5 mm diameter capsule with a 0.2 mm plastic outer layer. A hydride that releases its hydrogen over a period of 10-15 minutes coated in a good permselective polymer such as polymethyl methacrylate (PMMA) would experience internal pressures close to 80 MPa. For this reason the invention is limited to using very highly permeable materials with little selectivity.

In policy terms the government may wish to have security of energy supply and reduce $CO_2$ emissions to meet national and international targets. However, for the user of the technology this is of secondary importance, and its adoption will only occur if:

1) The cost premium gives significant improvements in performance (range, duration, speed, refueling or comfort and perhaps safety); or
2) It provides an economic benefit at little or no penalty in performance or safety.

So to be practical the hydrogen storage technology must be sufficiently inexpensive when it is made to scale, it must minimize the cost of the infrastructure needed to make, distribute and use it, it must be at least as safe as gasoline or batteries and it must have a performance comparable or better than existing technologies.

It is one object of the present invention to overcome or address the problems of prior art hydrogen storage materials or to at least provide a commercially useful alternative thereto. It is an alternative and/or additional object to provide hydrogen storage materials which are cheaper to make and/or more effective than known hydrogen storage materials. It is an alternative and/or additional object to provide hydrogen storage materials in which, upon heating, the gaseous impurities, for example borazine ($B_3H_6N_3$), diborane ($B_2H_6$), ammonia ($NH_3$) and/or other volatile impurities, are reduced. It is an alternative and/or additional object to provide a hydrogen storage material which has the necessary performance in terms of energy density, specific energy, temperature and kinetics of hydrogen release, and is safe to handle such that the handling equipment requirements are simple and inexpensive.

In the first aspect of the present invention there is provided a coated hydrogen storage pellet; wherein the pellet comprises a hydrogen-storage material; and the coating comprises a hydrogen-permeable polymer and the coating has a mean thickness of less than 50 μm.

The present invention will now be further described. In the following passages different aspects of the invention are defined in more detail. Each aspect so defined may be combined with any other aspect or aspects unless clearly indicated to the contrary. In particular any feature indicated as being preferred or advantageous may be combined with any other feature or features indicated as being preferred or advantageous.

Advantageously, the present inventors have addressed or overcome the problems of the prior art by forming a hydrogen-storage material (typically a hydride) into a solid pellet and applying a hydrogen-permeable coating (which is preferably permselective) on the outside of the pellet. This has a number of advantages:

1) In this pelletized form the material is easy to transport and handle. It can be treated as a fluid and transported in tankers, or it can be used in individual pellets and incorporated into devices.
2) The hydrogen-storage material (typically a hydride) is partially protected from water vapour and/or oxygen by the hydrogen-permeable coating giving it a longer shelf-life.
3) If any other volatiles are released as well as the hydrogen than these will be partially filtered when the coating is a permselective coating to produce a purer hydrogen source.

Preferably, hydrogen release from the pellets is achieved during thermolysis, i.e. when the pellet is heated to a predetermined temperature.

The speed of hydrogen release and the build-up of pressure in the coated pellets upon hydrogen release are important considerations. For the coated pellets to be of practical use it is preferable for hydrogen release to occur within 15 minutes once the material has reached a predetermined temperature. More preferably, hydrogen release will occur within 10 minutes once the material has reached a predetermined temperature. More preferably still, hydrogen release will occur within 5 minutes, or within 2 minutes once the material has reached a predetermined temperature. Preferably, during the above time periods at least 50%, at least 80%, at least 95% or at least 95% of the hydrogen available for release will have been released from the coated pellet.

The internal pressure within the pellet is a function of the speed of release and the rate at which the evolved gas permeates through the coating.

Preferably, the polymer coatings used herein are polymer membranes which work on the basis of a solution/diffusion mechanism, whereby gas which condenses onto the surface of the polymer dissolves into the polymer and diffuses through it. The flux of a species of gas or liquid through a membrane is governed by the permeability of that species in the membrane, the pressure difference across it and its thickness. Most membranes are selective in the sense that they are more permeable to some species than others, especially for glassy polymers where there is a trade-off between permeability and selectivity; the more selective the membrane, in general the lower its permeability. As the pellet is heated and the hydrogen begins to be released from the hydride, the pressure within the pellet increases, which drives the hydrogen through the membrane at a rate proportional to the pressure difference. For any reasonably selective membranes these pressures can be surprisingly large, typically many megaPascals (MPa).

There are three ways to reduce this pressure: increase the surface area to volume ratio, use a membrane (or coating) with a higher permeability or use a thinner membrane. Preferably, the coating is sufficiently thick so that there are substantially no and preferably no pin-holes.

The surface of the pellets are not necessarily smooth and it is likely that they will have a peak-to-peak roughness ($R_a$) in the micron range. Any coating applied to such a surface preferably is thicker than the peak-to-peak roughness. This means that there are limits to the minimum permeability; for example if the coating is 1 micron thick the adhesion or cohesion strength is 5 MPa then the minimum hydrogen permeability has to be $12 \times 10^{15}$ [mol m/(m² s Pa)].

A multiply layered barrier coating may provide improved results. For example by using a very highly permeable base layer that adheres strongly to the pellet and reduces the roughness of the pellet, it may be possible to add a further, much thinner layer, of lower permeability high-selectivity polymer that adheres well to the undercoat.

Preferably, the coating has mean thickness of less than 50 μm. Preferably the coating has an mean thickness of less than 10 μm. The thickness of the coating may be measured by sectioning and using microscopy or simply measuring the pellet weight gain before and after the addition of the coating and using known values for density.

Preferably, the mean coating thickness is from 0.01 μm to 50 μm. More preferably, it is from 0.1 to 10 μm.

Preferably, the coating adheres to the outside of the pellet sufficiently strongly so that it can withstand the internal pressures during hydrogen release without breaking. Polymer-polymer adhesion strengths depend on a large number of parameters such as: a cross-linking and the miscibility and hence entanglement of the two polymers. These strengths vary from a few MPa to tens of MPa and can be engineered to withstand the high internal pressures. Preferably, the adhesion strength of the coating needs to be in the region of from 0.5-20 MPa, more preferably, adhesion strength of the coating is in the region of from 1-10 MPa, or from 5 to 8 MPa. Adhesion strengths are most commonly measured with a pull-off test where a dolly is fixed to a flat surface of a pellet of known surface area and the minimum tensile stress, perpendicular to the surface, needed to detach or rupture the coating is measured as the dolly is pulled off. (ASTM D4511-09e1 or ISO4624)

Preferably, the adhesion strength of the coating is greater than the expected maximum pressure in the pellet which will be from 0.5 MPa to 20 MPa depending on the size of the pellet and speed of hydrogen release.

It will also be understood that the material of the pellet has a cohesion strength that exceeds this adhesion strength to prevent its structural failure.

As used herein the term "pellet" describes a compressed mass of material. Preferably, the pellet has a prescribed form and weight. Preferably, the pellet is in the form of a rigid, discrete single unit. The pellet may be cyclindrical shape or be in the form of a tablet.

Providing the hydrogen storage material in the form of pellets means that it can be treated as a fluid, and may be pumped into and out of containers in a similar way to many granular agricultural, pharmaceutical and food products. This has a number of advantages:

1) The pellets can be handled at the manufacturing plant using cheap and simple equipment;
2) They can be transported easily using road tankers similar to those used for gasoline currently;
3) If the pellets are to be used within a vehicle, they can be pumped into and out of the vehicle using equipment that would be of similar complexity and cost to existing fuel pumps. The technology would be easy to use and familiar to customers; and/or the vehicle or device could have two storage chambers one for unused pellets and one for used pellets. When the engine demands hydrogen, the pellets could be pumped to a heated chamber where the hydrogen is released and then pumped to the waste storage tank. This concept has been in the literature for many years (see Joseph Tracey et. al. U.S. Pat. No. 4,328,768).

There is an advantage in using smaller pellets as they have a larger surface area-to-volume ratio which minimizes the peak internal pressure. However, very small particles are prone to aerosol, particularly during an accident, making it possible to inhale or ingest them. And since they are high energy materials they would also be highly flammable as an aerosol. It is therefore preferred that the mean smallest dimension of the pellets is at least 0.1 mm, preferably at least 0.5 mm, more preferably at least 1 millimeter. Practical methods for transporting pellets also become more complex as the particle size is reduced, as their high surface area encourages them to sinter into a solid cake. The pellet size may be measured using a ruler or vernier gauge.

The pellet preferably has a mean longest dimension of less than 500 mm, more preferably less than 200 mm, more preferably still less than 100 mm, or less than 50 mm.

Preferably, the pellets have a mean weight of from 0.5 μg to 10 g. More preferably, the pellets have a mean weight of from 0.5 mg to 1 g.

Some of these hydrides form a pellet readily under pressures using a tablet press or an extruder, but others may require a binder or scaffold to hold them together. Typically this will be a polymer. To maintain a sufficiently high hydrogen content the polymer content of the uncoated pellet will preferably be less than 50% by weight, more preferably less than 35% based on the total weight of the uncoated pellet.

Some hydrogen-storage materials (typically hydrides) release other gases and volatiles alongside hydrogen, which may be potentially harmful to the operation of fuel cells. This is particularly true of the boron-based hydrides.

Preferably, the polymer used herein is gas-permselective. A permselect polymer is one that selectively allows one species of permeant to move through the polymer more freely than others. This depends on the diffusion constant and solubility of the permeant in the polymer. For most polymers, particularly those below their glass transition temperature the diffusion dominates and the log of the permeability scales well with the square of the molecules kinetic diameter. However, for some the solubility needs to be considered, particularly for condensable gases in rubbery polymers. By careful selection of a suitable pellet coating it is possible to create a barrier that removes a greater part of the impurities that are produced by many of the hydrides during thermolysis.

The selectivity of a permselective material for two different permeants is described by the ratio of the permeabilities for those two volatiles. For example if the permeability of hydrogen in a particular material is $P_H$ and the permeability of nitrogen is $P_N$ then the permelectivity is described by the ratio of these two permeabilities $$\alpha_{H/N} = P_H/P_N$$

For common gases and polymers this value can be found in the literature, but not for more unusual volatiles such as diborane.

Permeability can be measured by measuring the flux of the permeant through a membrane of a given thickness and pressure difference (ASTM Standard D 1434-82(2009)e1 or ISO 15105-1 and 15105-2).

Preferably, the ratio of the permeability of the polymer to hydrogen over nitrogen is at least 10, more preferably at least 20.

Most hydrogen-storage material (typically hydrides) are sensitive to a greater or lesser extent to water vapour and/oxygen. The polymer coating may not afford complete protection, but dramatically slows the ingress of these gasses, making it easier to handle the material and extending its shelf life.

The present invention includes making a pellet from the hydride then coating it in a polymer, which is preferably permselective. For mobile applications the Department of Energy in the US has specified performance parameters that hydrogen storage systems need to meet to be practical in different markets. For example, for vehicular applications the storage system has to have a hydrogen density of at least 4.5 weight percent by 2017. It should be borne in mind that this is a complete fuel system, including the hydrogen storage material and all of the equipment needed to extract the hydrogen safely. Typically at least half of the weight of the system is made up of this and the rest from the material itself. So to meet the 4.5 wt. % system target a material has to have a hydrogen content above 9 weight percent. Apart from a couple of exceptions only two classes of materials are able to achieve this: those based on aluminium and those based on boron. Thus, advantageously hydrides comprising aluminium and/or boron are used in the present invention with the aim of meeting this demanding target.

The borohydrides are based around a $(BH_4)$-complex which needs to be stabilized by bonding to an electron donor ligand. Some of the compounds that are potentially interesting include: lithium borohydride, sodium borohydride, potassium borohydride, magnesium borohydride, beryllium borohydride, calcium borohydride, aluminium borohydride, ammonium borohydride, guanidinium borohydride and lithium borohydride ammoniate. Others in this series might also be useable. The stability of these materials vary considerably and it is possible that mixtures of these compounds could be made that would release hydrogen at a temperature suitable for any given application.

Materials based around a borane $(BH_3)$-complex are also of interest. In particular we consider: ammonia borane, methyl amine borane, di-methylamine borane, trimethylamine borane, hydrazine borane, hydrazine bisborane, ammonia triborane, ammonium octahydrotriborane or a mixture of two or more thereof. Of these materials ammonia borane is the most practical as a single material although combinations of these materials could potentially be interesting.

The metal hydrides produce very pure hydrogen, but they are all very air-sensitive. Thus, such materials benefit from having a coating. Preferred metal hydrides are based on aluminium in particular aluminium hydride (alane), although lithium aluminium hydride (LiAlH$_4$) and sodium aluminium hydride (NaAlH$_4$), may also be used. Beryllium hydride has sufficient hydrogen density but there are issues with toxicity; and magnesium hydride, although its weight percentage is low, may be useful for some applications.

For the coating to remain intact during thermolysis the pellets must completely or substantially retain their shape and volume. Given the internal pressures generated as the hydrogen is released, this is a stringent condition. By observing a pellet as it is heated and measuring its size and shape before and after a heating cycle it is possible to observe and measure changes of only a few percent. However, whether a coating remains intact is a more complicated function of the pellet's expansion and the coating's elasticity at the temperature of the thermolysis. Millimeter sized pellets whose expansion in any dimension is less than 5% are possible candidates for coatings, but their ultimate performance can only be judged by the reduction in the impurity gases and volatiles during thermolysis.

If the core uses a polymer binder or scaffold to maintain the hydride in a solid form, this polymer needs to be able to survive the temperatures of the thermolysis and not interact chemically with the hydride or its thermolysis products. It also needs to be sufficiently rigid to resist the hydrogen pressure. For this reason it is preferable to use structural polymers, particularly those with high molecular weights.

The permselect coating also needs to survive the temperatures of the thermolysis and not interact chemically with the hydride or its thermolysis products. The coating needs to have a permeability sufficiently high such that the internal pressure within the pellet does not exceed the strength of the bond between the coating and the pellet core. It must also have a sufficiently high permselectivity such that it significantly reduces the release of any impurity gases or volatiles that the hydride should produce during thermolysis. The polymers with the highest permselectivity for a given permeability are glassy polymers which are operating below their glass transition temperature, but there are also potential advantages of using rubbery polymers as these are more likely to be able to stretch to accommodate any changes in the size of the pellet during the hydrogen release, so these cannot be ruled out.

The polymer coating can either be applied as a solution or lacquer of polymer which dries by solvent evaporation, or it can be applied as a thermoset polymer (either monomer or polymer) that is applied in the form of a liquid and cured with temperature or UV irradiation. In both cases it is important that the solvents, precursor chemicals, hardeners or catalysts do not chemically interact with the hydride over the timescale in which they are used.

The permselective, hydrogen permeable polymer could be either: a styrenic plastic, a polyester, a polyether, a polyimide, a polyamide, a polyolefins, a polyvinyl, an acrylic, a fluoropolymer, an elastomer, rubber or a mixture of two or more thereof. It could also be a blend of any of these, or a co-polymer.

The permselective polymer could also be a polymer of Inherent Microporosity (PIM) which is designed to have a rigid backbones made from fused aromatic rings that prevent it from packing efficiently. This creates a material with a large amount of interconnected free volume with voids with a dimension of less than 2 nm. These materials manage to have very high permeabilities but with loss of permselectivity. These are described in, Porous Polymers ©2011, Wiley & Sons Inc. ISBN 978-0-470-39084-9 Chapter 1 "Polymers with Inherent Microporosity", N. B. McKeown and P. M. Budd).

It is also possible to add particulate additives to the coating. This can either be to improve the strength and creep resistance or alter the permeation characteristics of the coating. For example aligned exfoliated graphite or clay can be used to increase the tortuous path of the permeant.

This changes the effective thickness of the coating but has no effect on the permselectivity. It is also possible to add small particles of materials such as carbon black, activated carbon or zeolites, which will selectively absorb impurities.

Many materials and blends are able to meet these specifications. Some examples are provided below:

Polystyrene [350 kDa] is a rigid glassy polymer with a melting point of over 200° C. and a low density which will make a tough lightweight outer coating. Its permeability at at 24° C. is around 8-10×10$^{-15}$ mol m/(m$^2$ s Pa) and the hydrogen/nitrogen permselectivity is around 40. The T$_g$ is 100° C. which means that the permeability will rise rapidly above this temperature and the selectivity will be reduced, but it will become softer and more able to cope with changes in the size of the pellet as the hydrogen is released. Polystyrene is also soluble in a number of polar solvents making it possible to make lacquers and solutions for spray or dip coating.

Cellulose acetate is often used as a filter material particularly in reverse osmosis applications. It has a high melting point of 230° C. and a low density. It hydrogen permeability is only around 1-2×10$^{-15}$ mol m/(m$^2$ s Pa) at @35 C but this rises rapidly with temperature and reaches acceptable values at the temperatures at which the hydrogen is released. It is soluble in ketones, esters and alcohols or water when the degree of substitution is low.

Polymethyl methacrylate is a rigid transparent thermoplastic with a melting point of 160° C. and a T$_g$ of between 85-165° C. depending on the molecular weight or formulation. It is a relatively low permeability high selectivity polymer that may produce unacceptably high internal pressures when used in coatings of greater than 1 micron, but it could be used as a thin second layer on top of a more highly permeable coating, or on pellets where the speed of hydrogen release is low.

Polyvinylidene fluoride or polyvinyldene difluoride (PVDF) is a chemical inert thermoplastic fluoropolymer. For a fluropolymer it has a low density (1.78 g/cm$^3$) and a melting point of 177° C. Its T$_g$ is −35° C. and so it is in its amorphous state during operation. It is soluble in a number of different solvents including dimethylformamide, tetrahydrofuran; it can also be emulsified for use in aqueous formulations. Although the hydrogen permeability at room temperature is low, it is reasonable at 120° C.

Polysulphone is a tough high-strength amorphous thermoplastic. It has a very high melting point of over 310° C. and a T$_g$ of 185° C. making it suitable for hydrides where the release temperature is higher than that of ammonia borane. It is soluble in polar solvents such as dimethylformamide N-methylpyrolidone and trichloroethylene. It is a good permselective material with a relatively high hydrogen permeability.

Any suitable method may be used to coat the core with the polymer coating, for example dip coating, pan coating, air suspension coating, spray coating including combinations of two or more methods thereof.

Preferably, pelletising the hydrogen storage material to form the pellet, provides a pre-formed single rigid unit which is capable of structurally supporting the coating.

In one aspect of the present invention there is provided a method of producing hydrogen, the method comprising heating the hydrogen storage pellet as described herein to release hydrogen from the hydrogen storage material through the coating. Preferably, the coating remains intact after hydrogen release. Thus, unlike a capsule which is designed to burst to release its contents, preferably the coating of the present invention remains intact after hydrogen release.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

The terms "approximately" and "about", as used herein in reference to a number, generally includes numbers that fall within a range of 10% in either direction of the number (greater than or less than the number) unless otherwise stated or otherwise evident from the context (except where such a number would exceed a possible value).

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The present invention will now be described further, by way of example only, with reference to the following figures, in which:

FIG. 1: An estimation of the pressure in a 1 mm diameter pellet containing 9 wt. % hydrogen (an ammonia borane/polymer mix) heated to 85° C. The pellet is 5 mm in diameter and has a 1 micron coating of PMMA.

Figure 2:
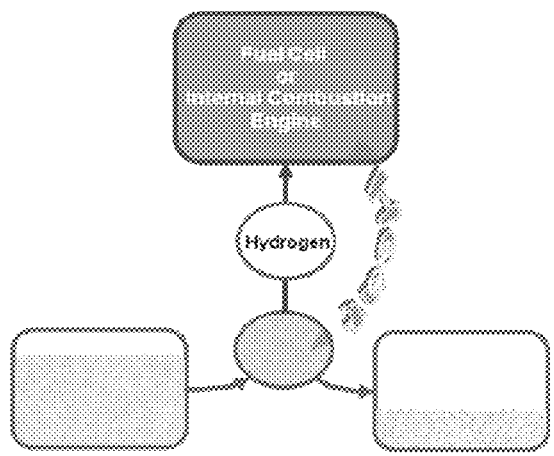

FIG. 2: shows a schematic of the storage vessels and heated chamber that can be used for pelletized hydrogen storage materials.

The following non-limiting examples further illustrate the present invention.

EXAMPLES

Example 1

A pellet made by mixing 2 MDa polyethylene oxide (PEO) in deionized water to a concentration of 3 weight percent. Complete dissolution takes more than 1 day. Ammonia borane (AB) powder, purchased from Minal Intermediates was then added to the solution to give a 66:34 AB/PEO ratio by weight and the solution stirred for two hours until dissolved. The solution was then frozen for 4 hours then the water was removed by freeze drying with a condenser temperature of −55° C. for 2 days. The removal of the water was checked by weighing the sample before and after the drying.

The freeze dried material was then put into a twin screw extruder, with a temperature stabilised at 70° C. The material was forced through a 3 mm diameter die and the extrudate cut in pellets approximately 4 mm long.

The surface of the pellet has an peak to peak roughness of approximately 0.5 µm and so a 3 µm layer of polystyrene is sprayed onto the outside of the pellet using a 2 weight percent solution of 350 kDa polystyrene dissolved in a 4:1 solution of toluene:tetrahydrafuran stirred at 40° C. for several hours. This is sprayed onto a bed of tumbling pellets using a tablet coater at temperatures between 40-50° C. The pellets are allowed to continue tumbling for 30 minutes at 50° C. after the spraying to ensure that they are dry and to improve the adhesion strength.

Example 2

The pellets are made using the process described in example 1. A solution of 1.25 weight percent cellulose acetate is added to a solution of 4:1 ratio of acetone and isopropyl alcohol. The solution is then sprayed onto the pellets using a tablet coater at a temperature of 40° C. to produce an mean coating thickness of 2-3 microns. After the majority of the solvent has evaporated the pellets are heated in the tablet coater to 50° C. for 30 minutes, before being cooled.

Example 3

A powder of alpha phase alane ($AlH_3$) is produced by crystallization from an etherate made via the Schlesinger reaction (A. E. Finholt, A. C. Bond and H. E. Schlesinger, J. Am. Chem. Soc. 69 (1947) 1195). This is pressed in a pellet using a press and a die in glove box with an oxygen partial pressure of <3 ppm and an $H_2O$ partial pressure of <0.1 ppm to produce a cylindrical pellet 3 mm in diameter and 3 mm long. A protective oxide layer is then created by washing the pellet briefly in dilute HCl.

Polystyrene is dissolved in THF at a concentration of 10 weight percent, by stirring at room temperature for 1 day. The pellet was then dip coated in the solution to make a coating approximately 10 µm thick.

The invention claimed is:

1. A coated hydrogen storage pellet having a mean smallest diameter of at least 0.1 mm and a mean largest diameter of less than 50 mm, wherein the pellet comprises:
a hydrogen-storage material consisting essentially of either ammonia borane or a composite of ammonia borane and a polyethylene oxide, and a hydrogen-permeable polymer coating having a mean thickness of less than 50 µm which is gas-permselective to prevent egress of borazine, diborane and ammonia from within the pellet.

2. The coated hydrogen storage pellet according to claim 1 wherein the pellet is in the form of a rigid, discrete, single unit.

3. The coated hydrogen storage pellet according to claim 1 wherein the ratio of the permeability of the hydrogen over nitrogen is at least 10.

4. The coated hydrogen storage pellet according to claim 1 wherein the polymer comprises one of a styrenic plastic, a polyester, a polyimide, a polyamide, a polyolefin, a polyvinyl, an acrylic, a fluoropolymer, an elastomer, rubber, or a mixture of two or more thereof.

5. The coated hydrogen storage pellet according to claim 1 wherein the mean coating thickness is from 0.01 µm to 50 µm.

6. The coated hydrogen storage pellet according to claim 1 wherein the pellet comprises less than 50% by weight of polymer based on the total weight of the uncoated pellet.

7. The coated hydrogen storage pellet according to claim 1 wherein the mean longest dimension of the pellet is less than 200 mm.

8. The coated hydrogen storage pellet as defined in claim 1, wherein the pellet is used for producing hydrogen.

9. The coated hydrogen storage pellet of claim 1 wherein the coating adheres to the hydrogen-storage material with an adhesion strength of 0.5 to 20 MPa.

10. The coated hydrogen storage pellet of claim 9 wherein adhesion strength is greater than the expected maximum pressure in the pellet.

11. The coated hydrogen storage pellet of claim 10 wherein the coating adheres to the hydrogen-storage material with an adhesion strength of 1 to 10 MPa.

12. The coated hydrogen storage pellet of claim 1 wherein the pellets have a mean weight of 0.5 µg to 1.0 grams.

13. The coated hydrogen storage pellet of claim 12 wherein the pellets have a mean weight of 0.5 mg to 1 gram.

14. The coated hydrogen storage pellet of claim 1 wherein the polymer exhibits a ratio of the permeability of hydrogen over nitrogen of greater than 10.

15. The coated hydrogen storage pellet of claim 14 wherein the polymer exhibits a ratio of the permeability of hydrogen over nitrogen of 20 or greater.

16. A method of making the coated hydrogen storage pellet as defined in claim 1, comprising providing a hydrogen storage material; pelletising the hydrogen storage material to form the pellet; and coating the pellet with a hydrogen-permeable polymer to form the hydrogen storage pellet.

17. The method of claim 16 wherein the pellet is coated with the polymer by one of dip coating, pan coating, air suspension coating, spray coating, or two or more of said coating processes thereof.

18. The method of claim 16, wherein said pelletising of the hydrogen storage material to form the pellet provides a pre-formed single rigid unit which is capable of structurally supporting the coating.

19. A method of producing hydrogen, the method comprising heating the hydrogen storage pellet as defined in claim 1 to release hydrogen from the hydrogen storage material through the coating.

* * * * *